United States Patent
Shinohara

(10) Patent No.: US 9,244,488 B2
(45) Date of Patent: Jan. 26, 2016

(54) DISPLAY DEVICE

(71) Applicant: PANASONIC CORPORATION, Osaka (JP)

(72) Inventor: Shinichi Shinohara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 14/084,344

(22) Filed: Nov. 19, 2013

(65) Prior Publication Data
US 2014/0148048 A1    May 29, 2014

(30) Foreign Application Priority Data
Nov. 26, 2012  (JP) .................. 2012-257570

(51) Int. Cl.
*H01R 13/60* (2006.01)
*G06F 1/16* (2006.01)

(52) U.S. Cl.
CPC .................. *G06F 1/1601* (2013.01)

(58) Field of Classification Search
CPC ........ H01R 13/60; G06F 1/1616; G06F 1/203
USPC ....................................... 439/533
See application file for complete search history.

(56) References Cited

U.S. PATENT DOCUMENTS

| | | | | |
|---|---|---|---|---|
| 5,045,974 A | * | 9/1991 | Ohkoshi et al. | 345/74.1 |
| 5,331,506 A | * | 7/1994 | Nakajima | 361/679.58 |
| 5,677,578 A | * | 10/1997 | Tang | 307/147 |
| 5,914,863 A | * | 6/1999 | Shen | 361/752 |
| 5,969,776 A | | 10/1999 | Han | |
| 6,385,041 B1 | * | 5/2002 | Choi | 361/679.41 |
| 6,510,061 B1 | * | 1/2003 | Lai | 361/816 |
| 7,878,845 B2 | * | 2/2011 | Byrne | 439/535 |
| 2011/0260555 A1 | * | 10/2011 | McGinley et al. | 307/116 |
| 2012/0108911 A1 | * | 5/2012 | Drysdale et al. | 600/300 |
| 2012/0118327 A1 | * | 5/2012 | Mazmanyan | 134/21 |

FOREIGN PATENT DOCUMENTS

| | | |
|---|---|---|
| JP | 5-026790 Y2 | 7/1993 |
| JP | 10-164462 A | 6/1998 |
| JP | 2008-012025 A | 1/2008 |

\* cited by examiner

*Primary Examiner* — Jean F Duverne
(74) *Attorney, Agent, or Firm* — McDermott Will & Emery LLP

(57) ABSTRACT

Display device includes: a first terminal part configured by arranging a plurality of connectors on a substrate; and a second terminal part configured by arranging a plurality of connectors on the substrate. The first terminal part includes a first support tool. The first support tool is provided with openings through which connection cables can be attached respectively to the connectors, and also provided with a first and a second mounting piece to be mounted on a mounting part. The second terminal part includes a second support tool. The second support tool is provided with openings through which connection cables can be attached respectively to the connectors, and also provided with a first mounting piece to be mounted on the mounting part on which the first mounting piece of the first support tool is mounted, and with a second mounting piece to be mounted on another mounting part.

14 Claims, 6 Drawing Sheets

DISPLAY DEVICE

RELATED APPLICATIONS

This application claims the benefit of Japanese Application No. 2012-257570, filed Nov. 26, 2012, the disclosure of which is incorporated by reference herein.

BACKGROUND OF THE INVENTION

1. Field of the Invention

The present technique relates to a thin display device such as a liquid crystal display device and a plasma display device.

2. Description of the Related Art

A thin display device such as a liquid crystal display device and a plasma display device employs a structure that a terminal part having various kinds of input/output terminals and control terminals such as an antenna input terminal, a component input terminal, an HDMI (registered trademark) terminal, and a video/sound output terminal is disposed on a back surface of the thin display device.

The terminal part of such a display device is configured by mounting a plurality of connectors respectively corresponding to the input/output terminals and the control terminals on a wiring substrate of an input/output circuit block. The terminal part includes support tools called brackets including openings respectively corresponding to the connectors, and the support tools having the openings corresponding to kinds and the number of the connectors are mounted on a chassis of the display device or on a back cover on the side of back surface of the display device so that only the connectors are exposed outside of the display device. The support tools are provided with indicating parts for indicating kinds of terminals so that connection cables can appropriately be connected to the respective connectors.

In a terminal part of an electronic device, as a structure using a bracket, there is known a structure in which a bracket is mounted on a substrate on which a terminal is disposed as described in Japanese Examined Utility Model Publication No. H05-26790.

SUMMARY OF THE INVENTION

A display device according to the present technique includes: a first terminal part configured by arranging a plurality of connectors on an end of one of sides of a substrate; and a second terminal part configured by arranging a plurality of connectors on an end of another side adjacent to the one side of the substrate. The display device further includes: a first support tool disposed on the first terminal part, and provided with openings through which connection cables can be attached respectively to the connectors, and also provided with a first mounting piece and a second mounting piece to be mounted on a mounting part; and a second support tool disposed on the second terminal part, and provided with openings through which connection cables can be attached respectively to the connectors, and also provided with a first mounting piece to be mounted on the mounting part on which the first mounting piece of the first support tool is mounted and with a second mounting piece to be mounted on another mounting part.

DETAILED DESCRIPTION OF THE PREFERRED EMBODIMENT

A display device according to an embodiment of the present technique will be described with reference to the drawings. However, excessively detailed descriptions are omitted in some cases. For example, detailed descriptions of already well known matters and redundant descriptions of substantially the same configurations are omitted in some cases. The omissions are for preventing the following description from unnecessarily becoming redundant and for facilitating understanding of persons skilled in the art.

It should be noted that the present inventors provide the accompanying drawings and the following description so that the persons skilled in the art can sufficiently understand the present technique, and it is not intended that the drawings and the description limit main subject matters described in claims.

Figure 1:
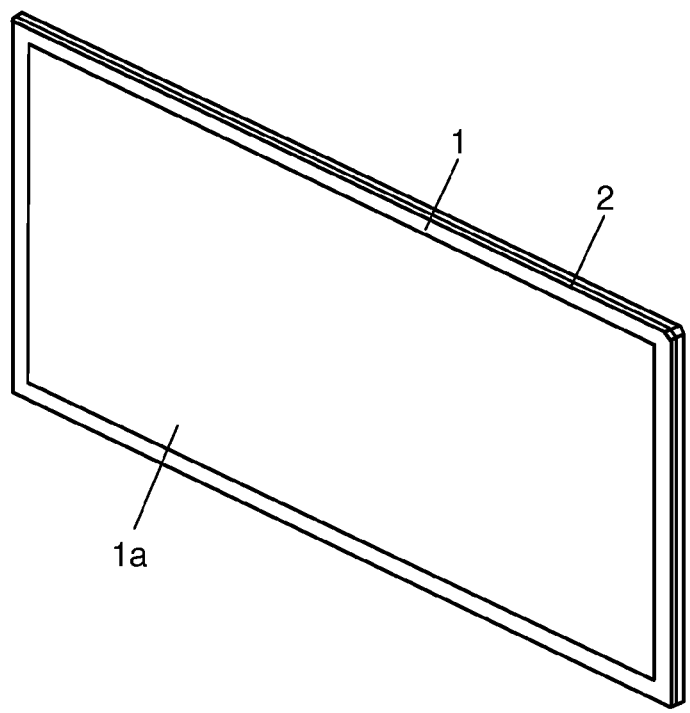
FIG. 1 is a perspective view of a display device according to an embodiment of the present technique as viewed from a display surface side of the display device.
Figure 2:
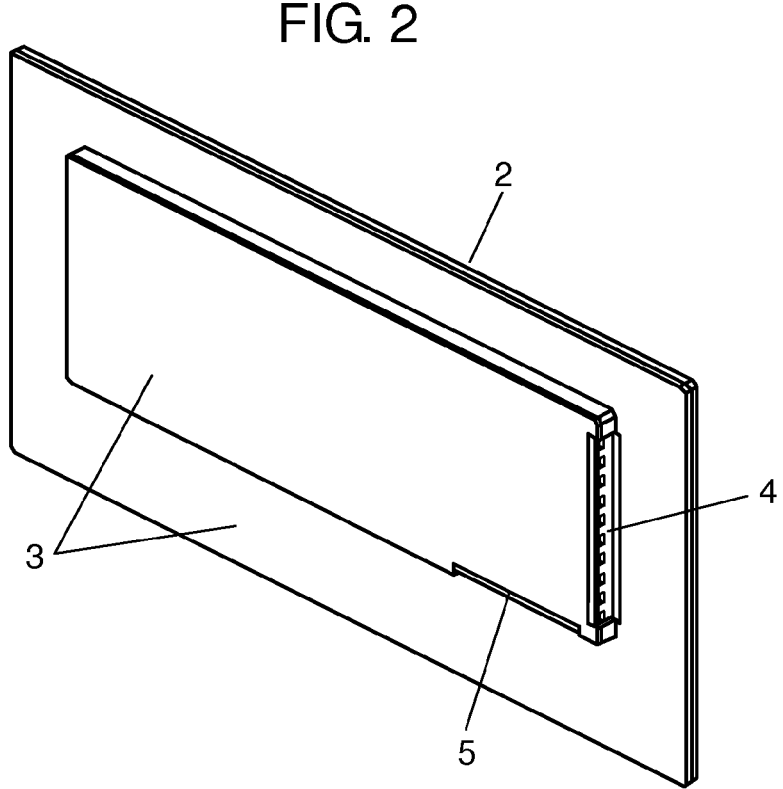
FIG. 2 is a perspective view of the display device as viewed from a back surface side thereof.

FIG. 1 is a perspective view of the display device according to the embodiment of the present technique as viewed from a display surface side of the device. FIG. 2 is a perspective view of the display device as viewed from a back surface side thereof.

As shown in FIGS. 1 and 2, the display device includes display panel 1 such as a liquid crystal display panel, metal or resin front panel 2 for covering a surrounding peripheral edge of screen 1a of display panel 1, and metal or resin back cover 3 configuring a housing of the display device together with front panel 2. As shown in FIG. 2, first terminal part 4 and second terminal part 5 provided by forming openings in a part of back cover 3 are disposed on the back surface side of the display device.

Next, an embodiment of the terminal parts of the display device according to the present technique will be described with reference to FIGS. 3 to 10.

Figure 3:
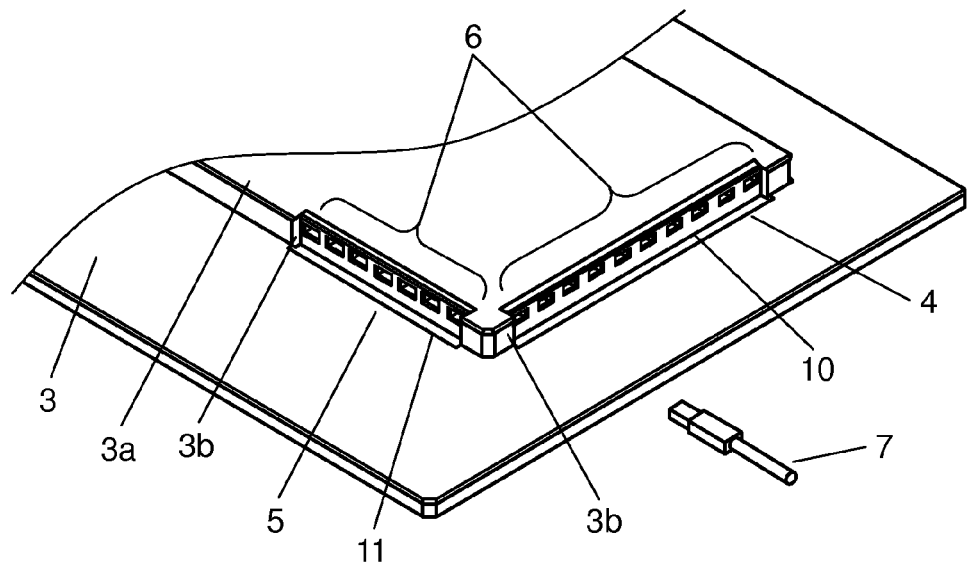
FIG. 3 is a perspective view showing terminal parts on the back surface side of the display device.
Figure 4:
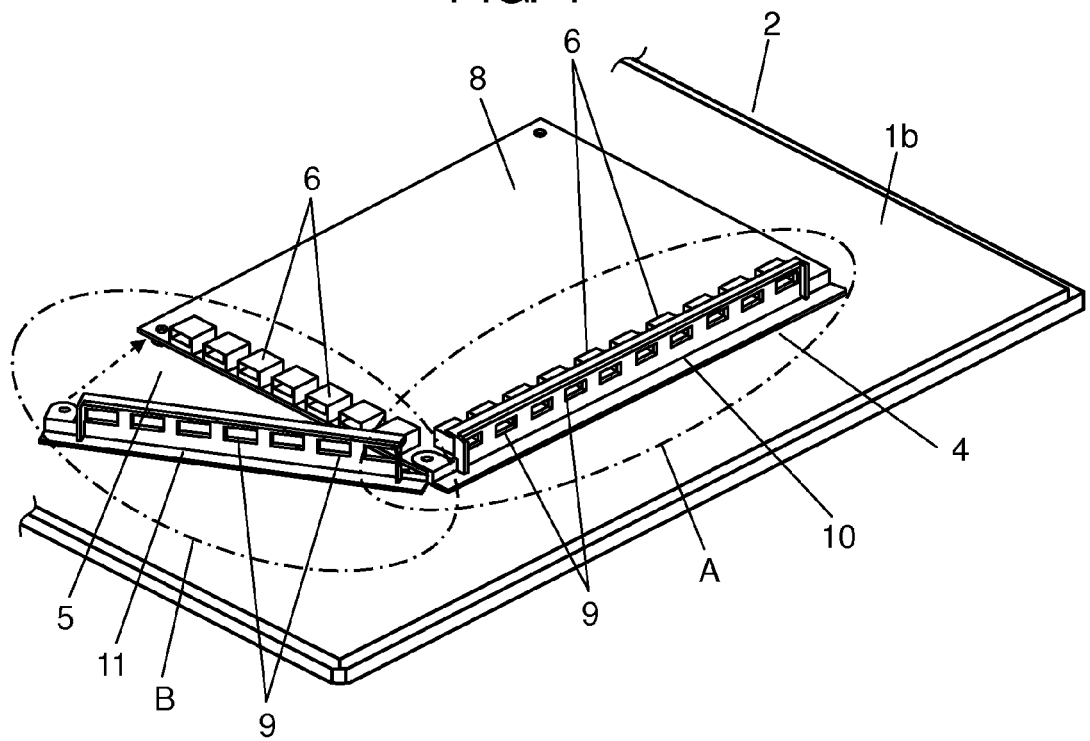
FIG. 4 is a perspective view of the terminal parts on the back surface side of the display device from which a back cover is detached.

FIG. 3 is a perspective view showing the terminal parts on the back surface side of the display device. FIG. 4 is a perspective view of the terminal parts on the back surface side of the display device from which a back cover is detached.

As shown in FIG. 3, first terminal part 4 and second terminal part 5 respectively includes a plurality of connectors 6. First terminal part 4 and second terminal part 5 are disposed in openings 3b of an end surface of swelling 3a of back cover 3 such that first terminal part 4 and second terminal part 5 are adjacent to each other. The connectors of first terminal part 4 and second terminal part 5 function as input/output terminals and control terminals of the display device, and the connectors are compatible with USB terminals, HDMI (registered trademark) terminals, D terminals, optical terminals, headphone terminals, LAN terminals, antenna terminals for broadcast wave such as ground wave, BS and CS, analogue input/output terminals, and card sockets into which IC cards and memory cards are inserted. Connection cable 7 is attached to each of connectors 6 for electrical connection with an external device.

As shown in FIGS. 3 and 4, first terminal part 4 and second terminal part 5 are configured by electrically and mechanically connecting the plurality of connectors 6 to wiring parts (not shown) of square substrate 8 of an input/output circuit block mounted on chassis 1b of display panel 1. That is, the plurality of connectors 6 of first terminal part 4 are connected to an end of one side of substrate 8 in a state where connectors 6 are arranged in a line, and the plurality of connectors 6 of second terminal part 5 are connected to an end of another side of substrate 8 which is adjacent to the former side in a state where connectors 6 are arranged in a line.

First terminal part 4 and second terminal part 5 respectively include first and second support tools 10 and 11 which are machined metal products or molded resin products called brackets. First and second support tools 10 and 11 respectively include openings 9 through which connection cables 7 can be attached to connectors 6. First and second support tools 10 and 11 of first terminal part 4 and second terminal part 5 are disposed on front sides of connectors 6 provided with connecting parts to which connection cables 7 are connected. First and second support tools 10 and 11 are mounted on chassis 1b together with substrate 8 such that first and second support tools 10 and 11 close openings 3b of swelling 3a of back cover 3.

According to this, in first terminal part 4 and second terminal part 5, connectors 6 are exposed outside through openings 9 of first and second support tools 10 and 11 so that connection cables 7 can be attached to connectors 6. Connectors 6 are disposed at such distances from one another that connection cables 7 do not interfere with each other when connection cables 7 are attached to connectors 6 through openings 9 of first and second support tools 10 and 11. FIG. 4 shows a state where one end of second support tool 11 is detached.

Figure 5:
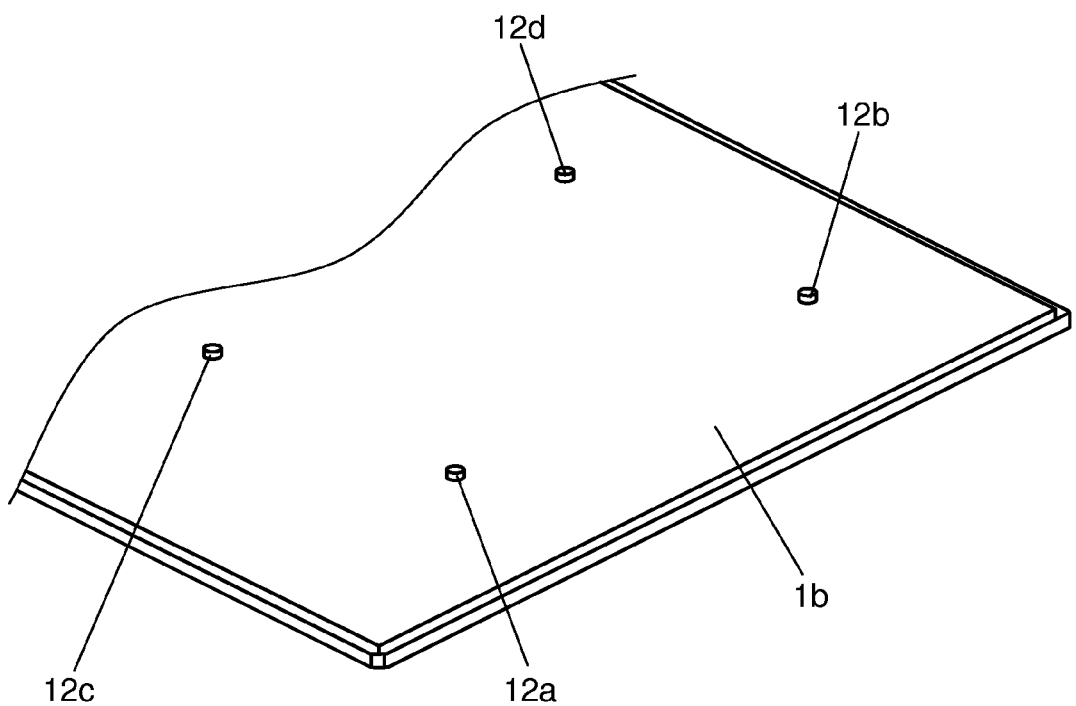
FIG. 5 is a perspective view showing a configuration of a chassis part of the display device on which the terminal parts are disposed.
Figure 6:
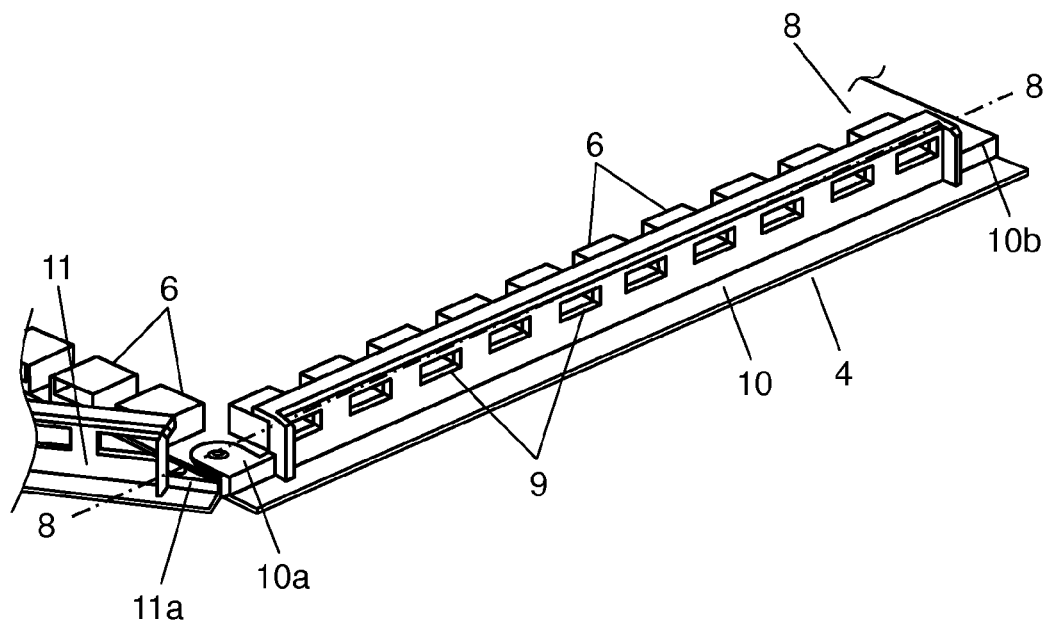
FIG. 6 is an enlarged perspective view of part A in FIG. 4.
Figure 7:
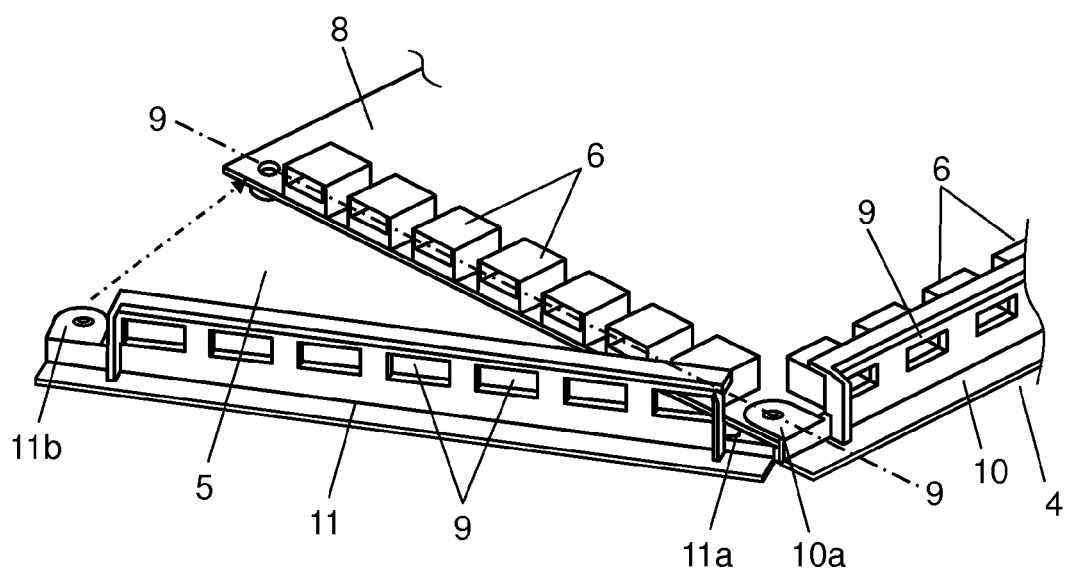
FIG. 7 is an enlarged perspective view of part B in FIG. 4.
Figure 8:
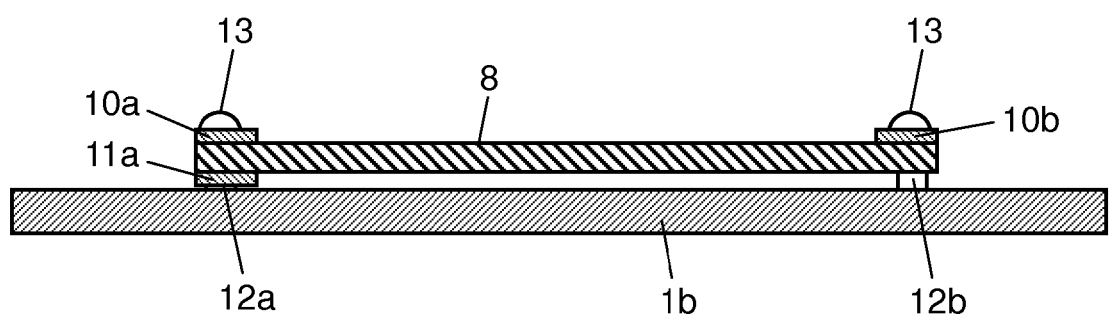
FIG. 8 is a sectional view taken along line 8-8 in FIG. 6.
Figure 9:
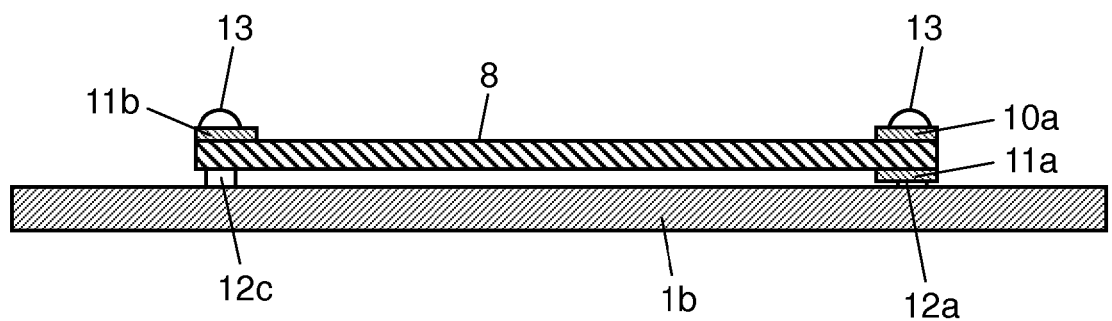
FIG. 9 is a sectional view taken along line 9-9 in FIG. 7.

FIG. 5 is a perspective view showing a configuration of a chassis part of the display device on which the terminal parts are disposed. FIG. 6 is an enlarged perspective view of part A in FIG. 4. FIG. 7 is an enlarged perspective view of part B in FIG. 4. FIG. 8 is a sectional view taken along line 8-8 in FIG. 6. FIG. 9 is a sectional view taken along line 9-9 in FIG. 7.

As shown in FIG. 5, a plurality of (four in the drawing) cylindrical mounting parts 12a, 12b, 12c, and 12d are provided on chassis 1b at locations where substrate 8 and first and second support tools 10 and 11 are mounted. Substrate 8 and first and second support tools 10 and 11 are mounted on mounting parts 12a, 12b, 12c, and 12d through screws 13. Of mounting parts 12a, 12b, 12c, and 12d, mounting part 12a is disposed at a location corresponding to a corner part where two sides of substrate 8 on which connectors 6 are disposed intersect with each other.

As shown in FIGS. 6 to 9, both ends of first support tool 10 of first terminal part 4 are respectively provided with first and second mounting pieces 10a and 10b. First and second mounting pieces 10a and 10b are superposed on an upper side of substrate 8, and are mounted on mounting parts 12a and 12b through screws 13 together with substrate 8. According to this, first support tool 10 is fixed to mounting parts 12a and 12b together with substrate 8.

On the other hand, second support tool 11 of second terminal part 5 is provided at its both ends with first and second mounting pieces 11a and 11b. First mounting piece 11a is disposed such that it is superposed on a lower side of substrate 8, and is mounted, through screw 13, on mounting part 12a on which first mounting piece 10a of first support tool 10 is mounted. Second mounting piece 11b is superposed on the upper side of substrate 8, and is mounted on mounting part 12c through screw 13. According to this, second support tool 11 is fixed to mounting parts 12a and 12c together with substrate 8. First mounting piece 11a of second support tool 11 has a difference in level with respect to second mounting piece 11b, and first mounting piece 11a is located lower than second mounting piece 11b.

As a structure for mounting first mounting piece 11a on mounting part 12a, it is possible to employ a structure in which first mounting piece 11a is sandwiched between mounting part 12a and substrate 8, thereby fixing first mounting piece 11a to mounting part 12a, and a structure in which first mounting piece 11a is sandwiched between chassis 1b and substrate 8 with a washer interposed therebetween, thereby fixing first mounting piece 11a to mounting part 12a.

Figure 10:
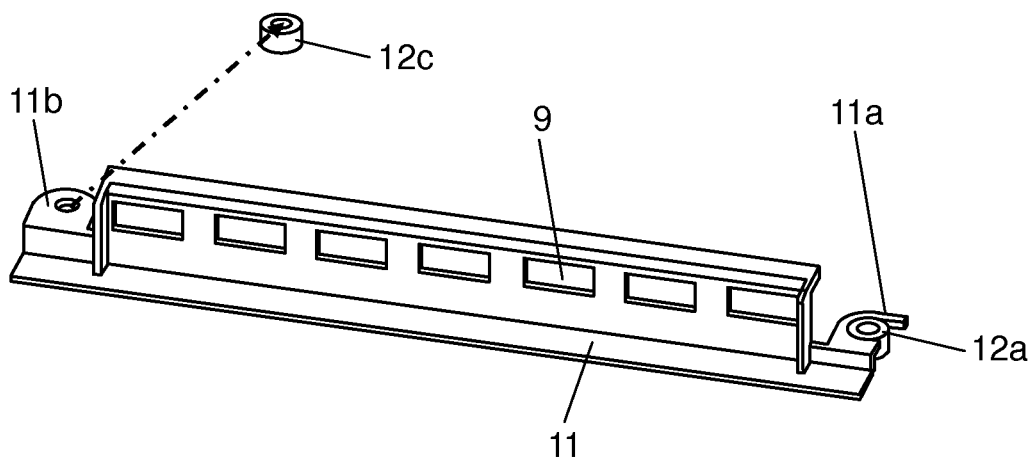
FIG. 10 is a perspective view showing one example of a support tool of a second terminal part.

FIG. 10 is a perspective view showing one example of the support tool of the second terminal part. As shown in FIG. 10, in second support tool 11 of second terminal part 5, first mounting piece 11a which is mounted on mounting part 12a together with first mounting piece 10a of first support tool 10 has a substantially U-shaped hole formed by notching a part of a hole through which screw 13 penetrates. As described above, first mounting piece 11a of second support tool 11 has the difference in level with respect to second mounting piece 11b, and first mounting piece 11a is located lower than second mounting piece 11b.

Therefore, when second support tool 11 is mounted, substrate 8 and first mounting piece 10a of first support tool 10 are firstly positioned with respect to mounting part 12a, and then U-shaped first mounting piece 11a of second support tool 11 is hitched to a lower side of substrate 8 of mounting part 12a. Then, second mounting piece 11b is positioned such that second mounting piece 11b comes to the upper side of substrate 8 with respect to mounting part 12c as shown by an arrow in FIG. 10, thereby mounting second support tool 11.

Figure 11:
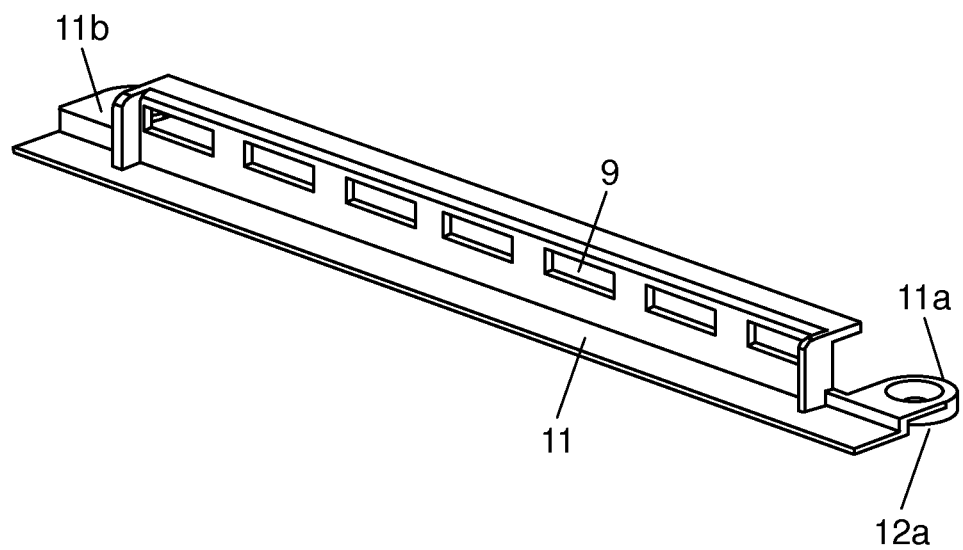
FIG. 11 is a perspective view showing another example of the support tool of the second terminal part.

FIG. 11 is a perspective view showing another example of the support tool of the second terminal part. In the example shown in FIG. 11, a hole of first mounting piece 11a through which screw 13 penetrates is circular. Like the previously described examples, first mounting piece 11a has the difference in level with respect to second mounting piece 11b, and first mounting piece 11a is located lower than second mounting piece 11b. That is, in the example shown in FIG. 11, first mounting pieces 10a and 11a and second mounting pieces 10b and 11b of first support tool 10 and second support tool 11 have circular holes.

In the case of second support tool 11 shown in FIG. 11, after first mounting piece 11a of second support tool 11, substrate 8, and first mounting piece 10a of first support tool 10 are positioned with respect to mounting part 12a in this order, second support tool 11 is fixed through screws 13. When first mounting piece 11a is positioned with respect to mounting part 12a, second mounting piece 11b may be positioned with respect to mounting part 12c at the same time or may be positioned later as shown in the example in FIG. 10.

As described above, the display device according to the present technique includes first terminal part 4 configured by arranging a plurality of connectors 6 on the end of one side of substrate 8, and second terminal part 5 configured by arranging a plurality of connectors 6 on an end of another side of substrate 8 which is adjacent to the former side of substrate 8. The display device includes: first support tool 10 disposed on first terminal part 4, and provided with openings 9 through which connection cables 7 can be attached respectively to connectors 6, and also provided with first mounting piece 10a and second mounting piece 10b to be mounted on mounting parts 12a and 12b; and second support tool 11 disposed on second terminal part 5, and provided with openings 9 through which connection cables 7 can be attached respectively to connectors 6, and also provided with first mounting piece 11a to be mounted on mounting part 12a on which first mounting piece 10a of first support tool 10 is mounted and with second mounting piece 11b to be mounted on mounting part 12c.

According to this, first mounting piece 10a of first support tool 10 and first mounting piece 11a of second support tool 11 are mounted on common mounting part 12a, and mounting part 12a is provided at a position corresponding to a corner part of substrate 8. According to this configuration, connectors 6 can be disposed also in the vicinity of the corner part of substrate 8, and the plurality of connectors 6 can efficiently be disposed in a region having a small part.

Substrate 8 on which connectors 6 are disposed is also mounted on mounting parts 12a, 12b, and 12c on which first support tool 10 and second support tool 11 are mounted. According to this, it is possible to configure the terminal part with a simple structure.

Further, since first mounting piece 11a and second mounting piece 11b of second support tool 11 are different from each other in level, it is possible to prevent mounting pieces from interfering with each other when first mounting piece 10a of first support tool 10 and first mounting piece 11a of second support tool 11 are mounted on common mounting part 12a.

Since first mounting piece 11a of second support tool 11 has substantially the U-shaped hole formed by cutting away a part of a hole, the operation for mounting second support tool 11 can easily be carried out.

In the above embodiment, a plurality of mounting parts including mounting part 12a provided at a position corresponding to the corner part where two sides of substrate 8 on which connectors 6 are disposed intersect with each other are provided on chassis 1b. However, when mounting parts on which substrate 8 is mounted and mounting parts on which first and second support tools 10 and 11 are mounted are separately provided, it is not absolutely necessary that the mounting parts are provided on chassis 1b, and the mounting parts on which first and second support tools 10 and 11 are mounted may be provided on back cover 3. Thus, it is only necessary that first mounting piece 10a of first support tool 10 and first mounting piece 11a of second support tool 11 are mounted on common mounting part 12a, and mounting part 12a is provided at a position corresponding to a corner part of substrate 8.

Further, in the above embodiment, a plurality of connectors 6 of first terminal part 4 are connected in the state where connectors 6 are arranged in a line on an end of one side of one square substrate 8, and a plurality of connectors 6 of second terminal part 5 are connected in the state where connectors 6 are arranged in a line on an end of another side adjacent to the one side of substrate 8. However, in addition to the configuration that connectors 6 are disposed on two sides of substrate 8, it is possible to employ a configuration that connectors 6 are disposed on three sides, and the shape of substrate 8 may be of a polygonal shape other than the square shape. The number of substrate 8 is not limited to one, and two or more substrates 8 may be used.

Furthermore in the above embodiment, although first mounting piece 11a and second mounting piece 11b of second support tool 11 are different from each other in level, first mounting piece 10a and second mounting piece 10b of first support tool 10 may also be different from each other in level. That is, the first mounting piece and the second mounting piece of at least one of first support tool 10 and second support tool 11 may be different from each other in level.

Although first mounting piece 11a of second support tool 11 has substantially the U-shaped hole formed by cutting away a part of a hole in the above embodiment, first mounting piece 10a of first support tool 10 may also have substantially a U-shaped hole formed by notching a part of a hole. That is, the first mounting piece of at least one of first support tool 10 and second support tool 11 may have substantially a U-shaped hole formed by notching a part of a hole.

As described above, the embodiment is described as an example of the technique in this disclosure. For this purpose, the accompanying drawings and the detailed description are provided.

Therefore, not only the indispensable configuration elements for solving the problem but also configuration elements which are not indispensable for solving the problem are included in the configuration elements illustrated and described in the accompanying drawings and the detailed description for exemplifying the technique. Hence, although the configuration elements which are not indispensable are illustrated and described in the accompanying drawings and the detailed description, it should not immediately be recognized that the configuration elements which are not indispensable are indispensable.

Since the above embodiment is for exemplifying the technique in this disclosure, the embodiment can variously be modified, replaced, and omitted or other elements can be added within claims or in a scope equal to claims.

What is claimed is:

1. A display device comprising:
    a backside chassis having an outer face, the outer face including first and second mounting parts;
    a substrate attached to the outer face of the backside chassis;
    a first terminal part including a plurality of connectors arranged on an end of a first side of the substrate;
    a second terminal part including a plurality of connectors arranged on an end of a second side of the substrate, adjacent to the first side of the substrate;
    a first support tool disposed on the first terminal part, and provided with openings through which connection cables can be attached respectively to the connectors, and also provided with a first mounting piece and a second mounting piece to be mounted on the first mounting part; and
    a second support tool disposed on the second terminal part, and provided with openings through which connection cables can be attached respectively to the connectors, and also provided with a first mounting piece to be mounted on the first mounting part on which the first mounting piece of the first support tool is mounted and with a second mounting piece to be mounted on the second mounting part.

2. The display device according claim 1, wherein the first mounting part is provided at a position corresponding to a corner part where the two sides of the substrate intersect with each other, and the connectors are disposed on the two sides.

3. The display device according claim 1, wherein the substrate on which the connectors are disposed is mounted on the first and second mounting parts on which the first support tool and the second support tool are mounted.

4. The display device according claim 1, wherein the first mounting piece and the second mounting piece of at least one of the first support tool and the second support tool are different from each other in level.

5. The display device according claim 1, wherein the first mounting piece of at least one of the first support tool and the second support tool has substantially a U-shaped hole formed by cutting away a part of a hole.

6. The display device according claim 1, wherein the first mounting piece and the second mounting piece of the first support tool and the second support tool have circular holes.

7. The display device according claim 1, wherein the first and second mounting parts are cylindrical protrusions.

8. The display device according claim 1, wherein the first support tool is a separate element from the second support tool.

9. A display device comprising:
a backside chassis having an outer face;
a substrate attached to the outer face of the backside chassis;
a first terminal part including a plurality of connectors arranged on an end of one of sides of a substrate;
a second terminal part including a plurality of connectors arranged on an end of another side adjacent to the one side of the substrate;
a plurality of mounting parts disposed on the outer face of the backside chassis, the plurality of mounting parts including a first mounting part, a second mounting part and a corner mounting part provided at a position corresponding to a corner part where the two sides of the substrate on which the connectors are disposed intersect with each other;
a first support tool disposed on the first terminal part, and provided with openings through which connection cables can be attached respectively to the connectors, and also provided with a first mounting piece to be mounted on the corner mounting part provided at the position corresponding to the corner part of the substrate and with a second mounting piece to be mounted on the first mounting part; and
a second support tool disposed on the second terminal part, and provided with openings through which connection cables can be attached respectively to the connectors, and also provided with a first mounting piece to be mounted on the corner mounting part on which the first mounting piece of the first support tool is mounted and with a second mounting piece to be mounted on the second mounting part.

10. The display device according claim 9, wherein the first mounting piece and the second mounting piece of at least one of the first support tool and the second support tool are different from each other in level.

11. The display device according claim 9, wherein the first mounting piece of at least one of the first support tool and the second support tool has substantially a U-shaped hole formed by cutting away a part of a hole.

12. The display device according claim 9, wherein the first mounting piece and the second mounting piece of the first support tool and the second support tool have circular holes.

13. The display device according claim 9, wherein the first, second and corner mounting parts are cylindrical protrusions.

14. The display device according claim 9, wherein the first support tool is a separate element from the second support tool.

* * * * *